(12) United States Patent
Renaud

(10) Patent No.: US 8,245,733 B2
(45) Date of Patent: Aug. 21, 2012

(54) CLIP FOR A PIPE OR DUCT

(75) Inventor: Michel C. Renaud, Prangins (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 183 days.

(21) Appl. No.: 12/943,046

(22) Filed: Nov. 10, 2010

(65) Prior Publication Data

US 2011/0108150 A1    May 12, 2011

Related U.S. Application Data

(60) Provisional application No. 61/260,444, filed on Nov. 12, 2009.

(51) Int. Cl.
*F16L 3/00* (2006.01)

(52) U.S. Cl. ........... 138/106; 138/178; 248/62; 403/397

(58) Field of Classification Search .......... 138/106–108, 138/177; 248/62; 403/397
See application file for complete search history.

(56) References Cited

U.S. PATENT DOCUMENTS

| | | | | |
|---|---|---|---|---|
| 3,154,281 A * | 10/1964 | Frank | ............................ | 248/201 |
| 3,370,815 A * | 2/1968 | Opperthauser | .............. | 248/74.2 |
| 3,899,005 A * | 8/1975 | Klimpl | ......................... | 138/106 |
| 4,445,255 A * | 5/1984 | Olejak | ........................... | 24/284 |
| 4,505,006 A * | 3/1985 | Andre | ........................ | 24/16 PB |
| 4,515,103 A * | 5/1985 | Greig | ............................. | 118/218 |
| 4,662,712 A * | 5/1987 | Tabata et al. | .................. | 385/102 |
| 4,688,961 A * | 8/1987 | Shioda et al. | ................. | 403/389 |
| 4,699,177 A * | 10/1987 | Thomas | ........................ | 138/103 |
| 4,850,396 A * | 7/1989 | McClish et al. | .............. | 138/103 |
| 4,927,103 A | 5/1990 | Nicholson | | |
| 4,951,902 A * | 8/1990 | Hardtke | ........................ | 248/74.1 |
| 6,634,391 B2 * | 10/2003 | Marchini et al. | .............. | 138/177 |
| 6,691,381 B2 | 2/2004 | Scollard et al. | | |
| 6,830,075 B1 * | 12/2004 | McKinney et al. | ........... | 138/106 |
| 7,316,246 B2 * | 1/2008 | Hayton | ......................... | 138/110 |
| 2002/0092576 A1 * | 7/2002 | Miller | ............................ | 138/106 |

FOREIGN PATENT DOCUMENTS

| | | |
|---|---|---|
| JP | 2002-295728 A | 10/2002 |
| JP | 2003-125523 | 4/2003 |
| JP | 2005-133783 A | 5/2005 |
| JP | 2008-196637 | 8/2008 |
| KR | 10-2005-0077059 A | 8/2005 |
| KR | 10-2007-0052022 A | 5/2007 |

* cited by examiner

*Primary Examiner* — Patrick F Brinson

(57) ABSTRACT

A clip (6) of molded plastics material for fitting on a pipe or duct in particular a blow-molded automotive fluid duct, comprises an open ring of generally C-shape having facing arms (20) that are curved and with open ends that can be sprung apart and together again to resiliently fit the clip on the pipe or duct. The facing arms (20) have profiled inner surfaces that engage with complementary profiles carried by the pipe or duct, namely the facing arms (20) have a substantially T-shaped profile (23/24), that fits between pairs of complementary spaced-apart arcuate ribs and recess carried by the pipe or duct. The clip (6) is easy to fit and remove while providing firm holding power and good pull-out strength.

15 Claims, 5 Drawing Sheets

CLIP FOR A PIPE OR DUCT

CROSS REFERENCE TO RELATED APPLICATION

This invention claims the benefit of U.S. Provisional Application No. 61/260,444, filed Nov. 12, 2009.

FIELD OF THE INVENTION

This invention relates to clips or clipped brackets for fitting on a pipe or duct, for example an automotive fluid duct which can be an air or water duct.

BACKGROUND OF THE INVENTION

Automotive fluid ducts are commonly made by blow molding or extruding a resin. These fluid ducts may require additional brackets to position or maintain the duct under the hood, e.g. to avoid contact of the duct with other components, or to hold cables, drains and other lightweight components surrounding the duct. Most brackets are injection molded components that are welded to the duct. Injection molded parts have a defined geometry mating the duct onto a counter dome. The preferred bonding techniques to join the bracket to the duct are generally welding or occasionally overmolding. Both techniques require either welding equipment and fixtures or a robot to dispose an insert inside the molding cavity between molding sequences.

It would be desirable to have a bracket or clip that could be fitted onto a duct or pipe without the need for welding. Various resilient clips are known but they have not proven to be entirely satisfactory such that welding fitment is still commonly used.

Japanese Patent Application Publication JP 2008 196637-A discloses a plastic clamp that requires a particular, complicated tube/duct configuration. U.S. Pat. No. 6,691,381 discloses a mounting clip of particular configuration for mounting a fuel rail, wherein the clip, which is usually of metal, has openings which receive projections on the pipe. Japanese Patent Application Publication JP 2003 125523-A discloses mounting two split rings on a support, between which a circumferential rib on the pipe fits. U.S. Pat. No. 4,927,103 discloses a pipe support system where a pipe fitting having a socket with resilient grooved arms receives lugs on the pipe.

Although the prior art has provided resilient clips for fitting on a pipe or duct, the prior art clips are unsatisfactory in that they require some or all of the following features: pipes of complicated profile, no convenient fit, removal from the pipe, and inconsistent pull-out strength. Thus, prior art clips fail to meet the features of the clip described herein.

SUMMARY OF THE INVENTION

The present invention is directed to a resilient plastic clip for fitting on pipes or ducts wherein the clip does not require welding and the clip has improved ease of fitting and removal, while providing accurate fitting with good pull-out strength.

Described herein is a clip of molded plastics material for fitting onto a pipe or duct, the clip comprising an open ring of generally C-shape having facing arms, the facing arms having open ends that can be sprung apart and together to resiliently fit the clip onto a pipe or duct of corresponding diameter, each facing arm having i) a profiled inner surface adapted to engage with complementary profiles carried by the pipe or duct whereby the clip is held onto the pipe or duct, and ii) an inwardly-directed arcuate rib extending along the inner face of the facing arm and forming a substantially T-shaped profile, the profile having a projecting edge, wherein each substantially T-shaped profile forms in each facing arm a pair of arcuate recesses that are adapted to receive a pair of complementary spaced-apart arcuate ribs carried by the pipe or duct and, wherein the projecting edge of each profile faces inwards and forms part of a generally cylindrical inside surface of the clip, such that when the clip is fitted onto a pipe or duct the projecting edge fits into the complementary profiles carried by the pipe or duct and the arcuate ribs carried by the pipe or duct fit into the arcuate recesses formed in each facing arm, whereby the clip is held onto the pipe or duct.

BRIEF DESCRIPTION OF THE DRAWINGS

The invention will be further described by way of example with reference to the accompanying drawings, wherein.

DETAILED DESCRIPTION OF THE FIGURES

Figure 1:
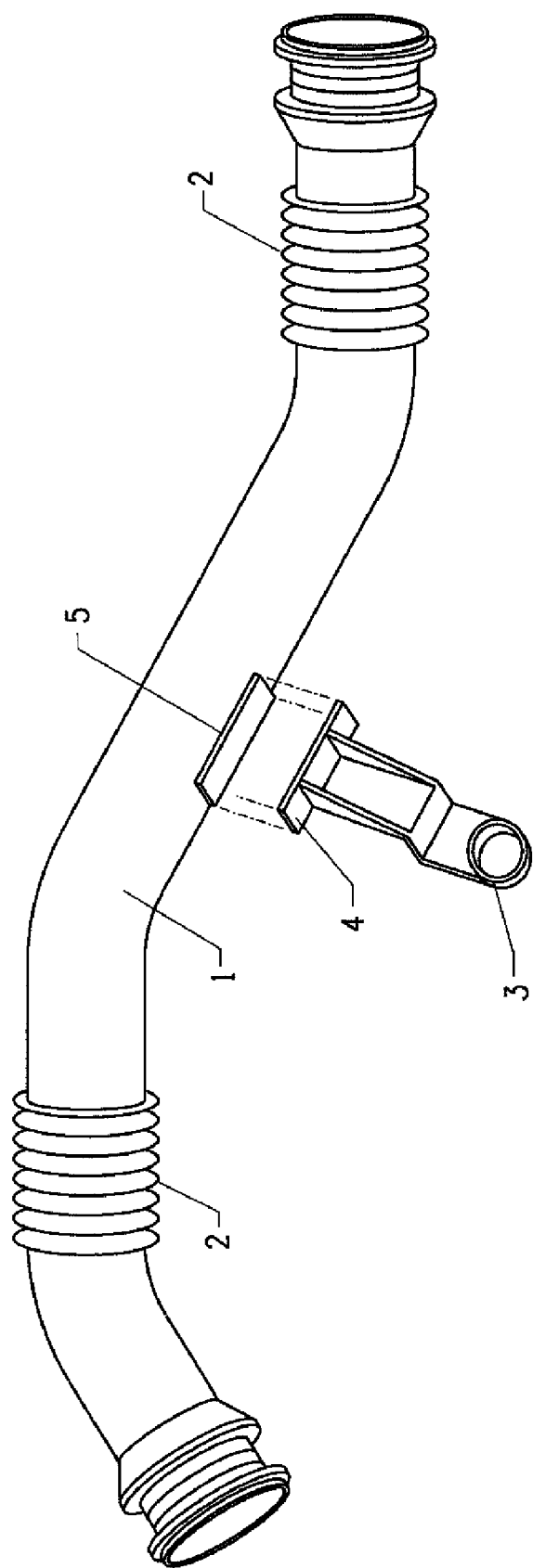
FIG. 1 is a view of a section of a pipe/duct showing a prior art bracket.

FIG. 1 shows a length of a pipe or duct 1 ["pipe/duct 1"] made in a resin by blow molding with a prior art bracket attached. Typical applications are automotive air ducts for air induction or coolant ducts for thermal management.

DETAILED DESCRIPTION OF THE INVENTION

The clip of the present invention is formed of molded plastics material and is particularly useful for fitting onto a pipe or duct, for example automotive fluid ducts. Examples of such ducts include air and water ducts.

The clip of the invention comprises an open ring of generally C-shape having facing arms. Each facing arm of the clip has an inwardly-directed arcuate rib extending along the inside face thereof that forms a substantially T-shaped profile in the inside face of the arm. Each profile has a projecting edge that faces inward and which forms part of a generally cylindrical inside surface of the clip. Thus, when the clip is fitted on a pipe or duct, the edge of the substantially T-shaped profile clips against the outer diameter of the pipe or duct. Each substantially T-shaped profile defines on its opposite sides recessed parts of generally inverted-L section that form arcuate recesses in the facing arms. Each pair of arcuate recesses is thereby adapted to receive a pair of complementary spaced-apart arcuate ribs carried by the pipe or duct to hold the clip on the pipe or duct.

In one embodiment, the C-shaped clip may have a central part that is has an internal surface generally of partially-cylindrical shape that is extended on each side by the surface of the inwardly-facing edge of the substantially T-shaped profile.

By virtue of the T-shaped profile on the facing arms of the inventive clip, the clip is easily bent and has improved torsional resistance, making it very easy to fit and remove from the pipe or duct. Moreover, this T-shaped profile, by its cooperation with complementary pairs of arcuate ribs on the pipe or duct, provides a firm fit on the pipe or duct both angularly and axially and also provides the clip with good pull-off strength.

Also described herein is a pipe or duct fitted with a clip as set out above, wherein the pipe or duct comprises two pairs of side-by side arcuate ribs on opposite sides of a cylindrical part of the pipe or duct. The two pairs of side-by side arcuate ribs are aligned with one another leaving uninterrupted cylindrical surface parts on opposite sides of the pipe or duct between the ends of the two pairs of side-by-side arcuate ribs. These pairs of side-by-side arcuate ribs on the pipe or duct are adapted to be received in the pairs of arcuate recesses on either side of the substantially T-shaped profiles on the facing arms of the clip.

Also described herein is a clip in combination with such a pipe or duct, in particular an automotive fluid duct.

The pipe or duct that is adapted to be fitted with a clip and having two pairs of side-by-side arcuate ribs as described herein can be formed of stiff and rigid resins such as polyamides and polyesters, including polyamides referred to in the art as polyamide 6, polyamide 66, polyamide 6/61, polyamide 6.12, polyamide 10.10 (also known as nylon 6, nylon 66, nylon 6/6T, nylon 6.12 and nylon 10.10), polybutylene terephthalate (PBT), and other rigid polyamides and polyesters, all these grades being optionally reinforced with glass fibers. These pipes or ducts can also be made in flexible resins such as thermoplastic copolyetheresters, for example Hytrel® copolyetherester elastomer, available from E.I. du Pont de Nemours and Co., engineering thermoplastic vulcanizates (ETPV), which are combinations of a thermoplastic matrix and an elastomer phase, for example a mixture of a thermoplastic component and an ethylene acrylic rubber thermoplastic vulcanizate. Commercially available examples include, but are not limited to fluoroelastomer thermoplastic vulcanizates (FKM-TPV) (available from Freudenberg NOK GP), ETPV (available from E.I. du Pont de Nemours and Company), polyamide zo polyacrylate thermoplastic vulcanizates such as Zeotherm® thermoplastic vulcanizates (available from Zeon Chemicals L.P.), thermoplastic silicone vulcanizates, such as TPSiV™ (available from Multibase S.A.), EPDM polypropylene thermoplastic vulcanizates, such as Santoprene® (available from ExxonMobil Chemical Corp.), flexible polyamides, also known as thermoplastic alloys, generally polyamide 6 alloys, for example Zytel® FN nylon alloy, available from E.I. du Pont de Nemours and Co., Orgalloy® resins, available from Arkema, Inc., Grilon® plastic resins, available from EMS-Grivory, and Akulon® polyamide resins, available from DSM. When such materials are used, as shown in FIG. 2, bellows 2 may be added to flex the part.

In some instances fluid pipes/ducts may require at least one prior art bracket 3, an example of which is shown in FIG. 1, to maintain position under the automobile hood and particularly to avoid contact with other components. Bracket 3 may also position cables, drains and other components surrounding the pipe/duct. Such brackets generally are injection molded parts that are welded to the pipe/duct and possess a defined geometry with end plate 4 mating the duct 1 on a counter dome 5, as shown in FIG. 1. Preferred bonding techniques for joining bracket 3 to pipe/duct 1 typically include welding and, occasionally, overmolding. These processes require either welding equipment and fixtures or a robot to dispose the insert inside the mold cavity between two molding sequences.

The clip described herein simplifies installation of brackets onto fluid pipes/ducts inasmuch as this clip (which is generally injection molded) press fits onto pipe/duct 1 and possesses features that correspond to features on the pipe/duct in order to provide ease and accuracy in fitting and removal as well as good pull-out strength.

Figure 2:
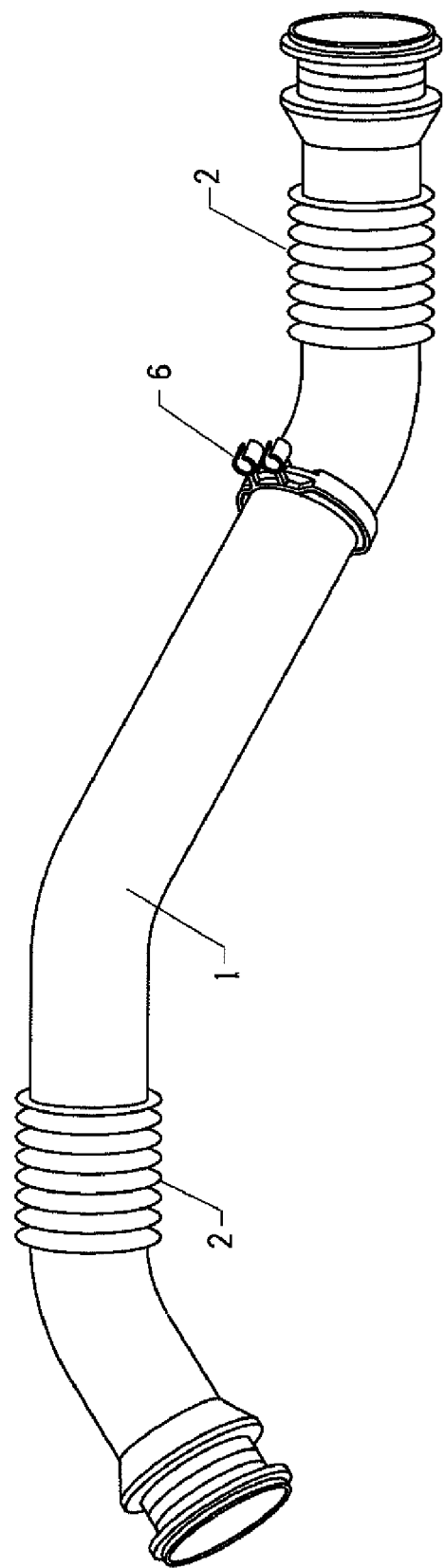
FIG. 2 is a view of a section of a pipe/duct showing the duct fitted with the clip described herein.

FIG. 2 shows pipe/duct 1 fitted with clip 6, described herein, and with bellow 2.

Figure 3:
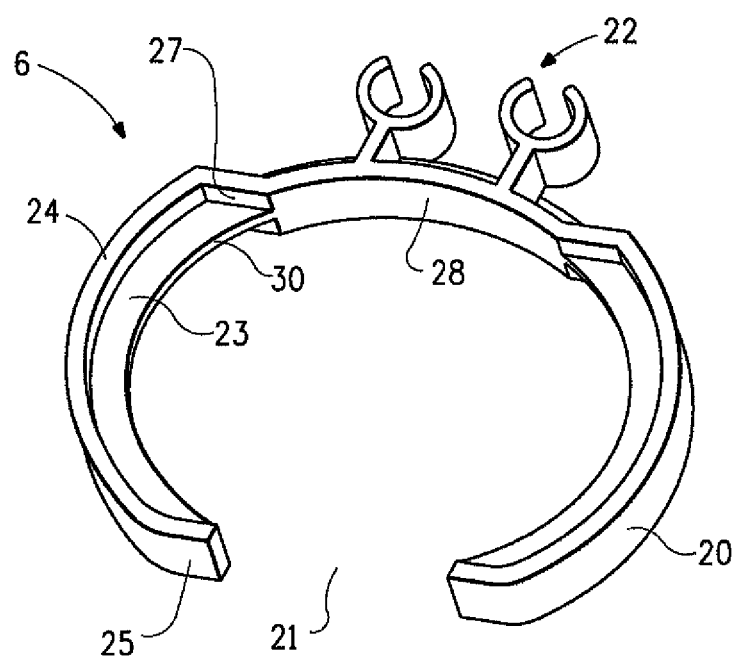
FIG. 3 is a perspective view of a clip according to the invention from one angle.
Figure 4:
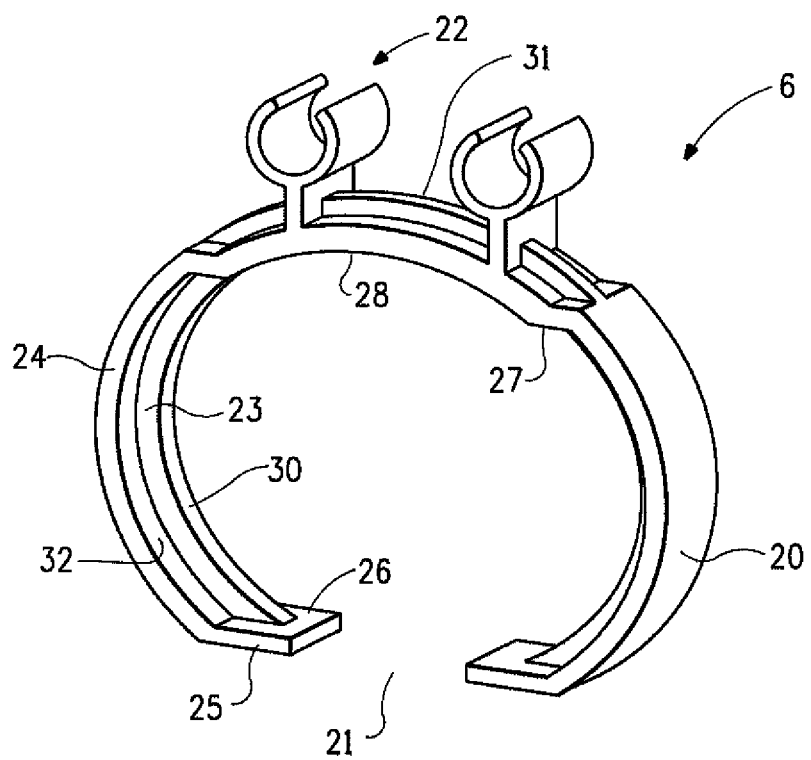
FIG. 4 is a perspective view of a clip according to the invention from another angle.

Referring now to FIGS. 3 and 4, clip 6 comprises an open ring of a general C-shape and having facing, curved arms 20 with open ends 26, which comprise hooks 25, that can be sprung apart and together again so that clip 6 may resiliently fit around and be mounted onto pipe/duct 1, which has a corresponding diameter to the C-shape of clip 6. Facing arms 20 have inner surfaces 23/24 that together create a profile that engages with the complementary profile created by the configuration of elements 7/8 (see FIG. 6) on pipe/duct 1 so that clip 6 may be positioned around and mounted onto pipe/duct 1.

Facing arms 20 of clip 6 each have an inwardly-directed arcuate rib 23 extending along and forming in the inside face of arm 20 a substantially T-shaped profile 23/24 and which has projecting edge 30 that faces inwards. Projecting edge 30 forms part of and merges with inside surface 28, which is generally cylindrical. When clip 6 is fitted onto pipe/duct 1, surface 28 and projecting edge 30 fit into, that is, are mounted securely, against the outside diameter of pipe/duct 1 by virtue of arcuate rib 23 being received into recess 8 of pipe/duct 1.

The operation of fitting occurs by the following mechanism: each substantially T-shaped profile 23/24 defines, in its opposite lateral sides, recessed parts of generally inverted-L section that form a pair of arcuate recesses 32 (only one of the pair is shown in FIG. 4) in facing arms 20. Each pair of arcuate recesses 32 is adapted to receive a pair of complementary spaced-apart arcuate ribs 7 and recess 8 carried by pipe/duct 1. Fitting clip 6 onto pipe/duct 1 is effected by fitting the 23/24/32 configuration of clip 6 together with the complementary 7/8 configuration of pipe/duct 1.

By virtue of the T-shaped profile 23/24, clip 6 may bend with improved torsional resistance, making it fittable and removable with ease from pipe/duct 1. Moreover, the cooperation of this T-shaped profile with complementary pairs of arcuate ribs 7 and recess 8 on pipe/duct 1 provides clip 6 with a firm fit both angularly and axially on pipe/duct 1 and with good pull-off strength.

Figure 5:
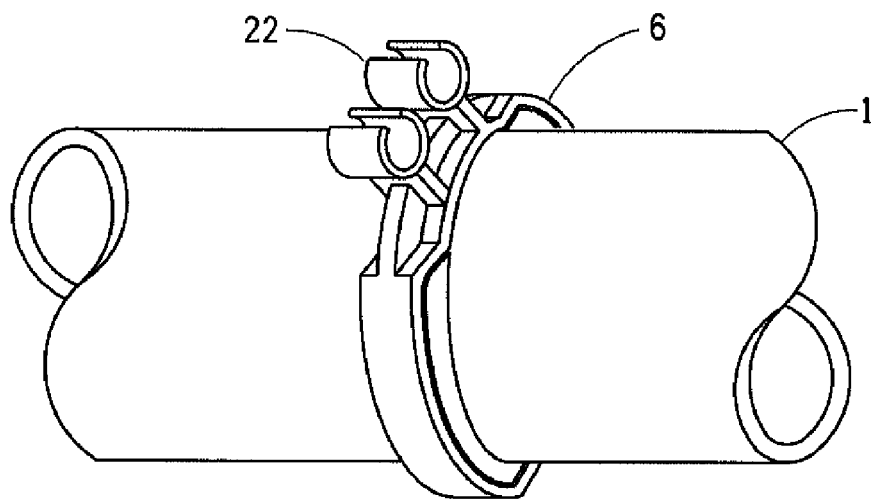
FIG. 5 shows a section of a duct fitted with a clip according to the invention from one angle.
Figure 6:
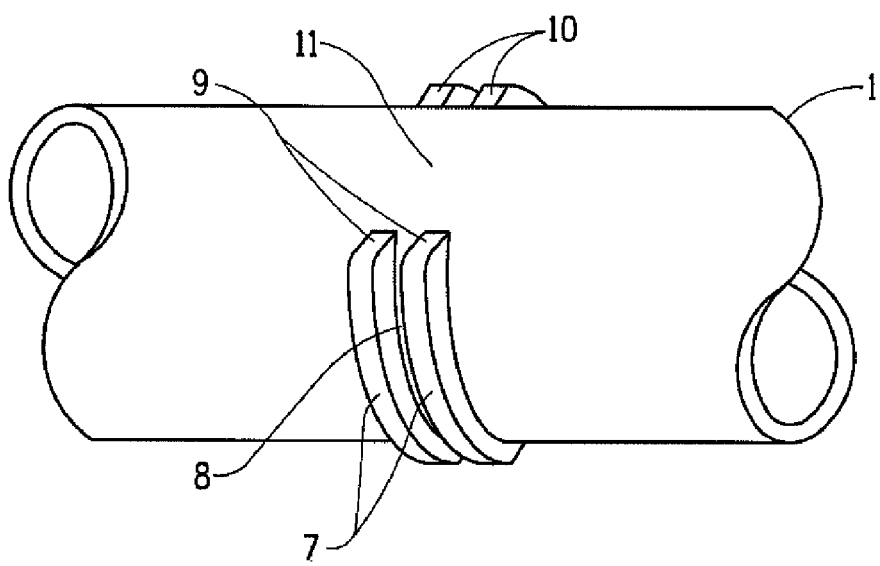
FIG. 6 shows a section of a duct according to the invention with its pairs of spaced-apart arcuate ribs from one angle.

Referring now to FIGS. 5 and 6, pipe/duct 1 comprises two pairs of side-by side arcuate ribs 7 on opposite sides of a cylindrical part of pipe/duct 1. Each rib in a pair of arcuate ribs is parallel to each other. The two pairs of side-by side arcuate ribs 7 are aligned with one another at their ends but the pairs of arcuate ribs need not encircle pipe/duct 1. This means that, when the pairs of arcuate ribs 7 do not encircle pipe/duct 1, there is an uninterrupted cylindrical surface 11 on opposite sides of the pipe/duct. Recess 8 is created between each pair of arcuate ribs 7. As previously mentioned, when clip 6 is fitted onto pipe/duct 1, the pairs of arcuate ribs 7 are adapted to be received into the pair of arcuate recesses 32, which are on either side of the substantially T-shaped profiles 23/24 on facing arms 20. Arcuate ribs 23 with their projecting edge 30 are received into recesses 8 of pipe/duct 1.

The pairs of side-by-side arcuate ribs 7 may be situated on a section of pipe/duct 1 that is spaced apart axially from at least one flexible section that includes bellows 2 (See FIG. 2).

As FIG. 6 shows, parallel arcuate ribs 7 for securing clip 6 onto pipe/duct 1 may be created directly by a molding process onto the surface of the pipe/duct, thereby avoiding post machining. Moreover, the pipe or duct is advantageously blow molded, extruded or injection moulded from plastics material such that the pairs of arcuate ribs are integrally molded at a location where a clip is to be fitted.

Ribs 7 preferably include two inclined shoulders 9 at one of their extremities, i.e. close to fixation elements 22. Inclined shoulders 9 extend from the ends of ribs 7 to surface 11, a rib-free and smooth cylindrical-surfaced area of pipe/duct 1 between the end of ribs 7. The same design, comprising the elements 7, 8 and 9 will be vertically mirrored on the opposite face of pipe or duct to create an equivalent geometry 10.

Figure 8:
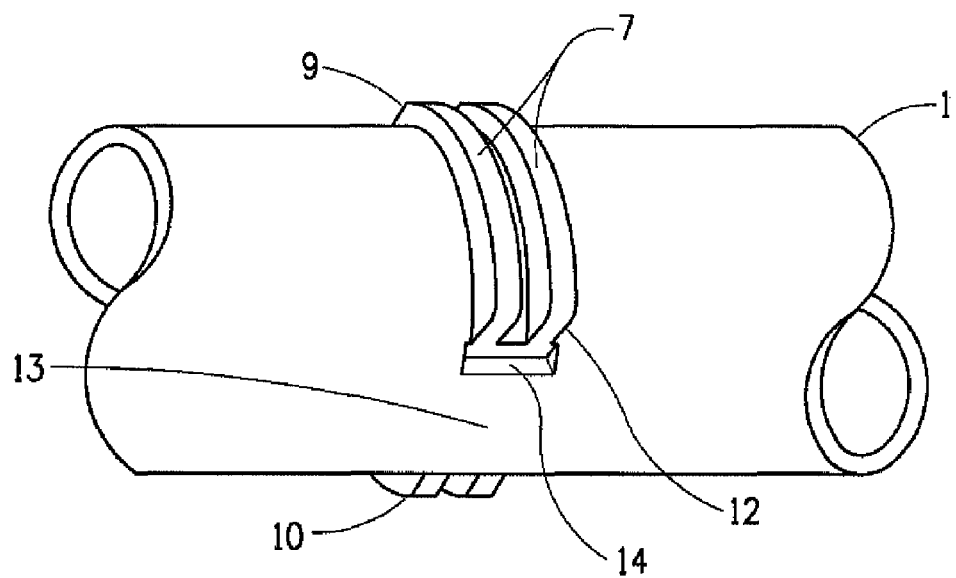
FIG. 8 shows a section of a duct according to the invention with its pairs of spaced-apart arcuate ribs from another angle.

Referring now to FIG. 8, similar shoulders 12 may be created by mirroring the inclined shoulders 9 horizontally, so that a rib-free and smooth duct surface 13 will be created on the opposite side. Consequently, surfaces like 11 and 13 oppose each other, and shoulders 9 and 12 oppose each other as well. Moreover, if needed, an additional light recess 14 penetrating the duct can be added to further increase the surface areas 12 opposite to surfaces 9, at the location where clip ends 25/26 are received.

Clip 6 is made of a generally C-shaped open ring with facing curved arms 20, comprising an opening 21 and cable holders 22 or fixing domes for screws on the outside of its central part. Generally, the central part of C-shaped clip 6 can carry one or more outwardly-extending members such as 22 for securing cables and the like to clip 6 or for securing clip 6 to a support and thereby forming a bracket for supporting the pipe/duct.

Referring now to FIG. 4, the substantially T-shaped profiles 23/24 extend to ends 26 of facing arms 20. Ends 26 conclude as and function as hooks 25 because the top parts of the substantially T-shaped section merge into inner edge of end 26.

Figure 7:
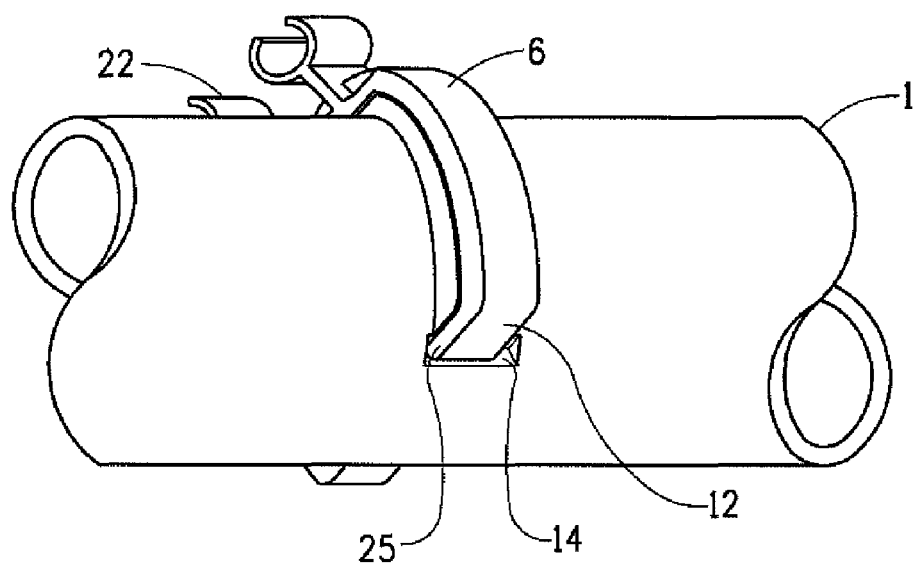
FIG. 7 shows a section of a duct fitted with a clip according to the invention from another angle.

Referring now to FIGS. 7 and 8, to prevent undesired pull-out of clip 6 when it is fitted onto pipe/duct 1, clip 6 includes the aforesaid arcuate rib 23 (see FIG. 4), which is received within recess 8 and between ribs 7 (of the pipe/duct). Hook-ends 25 of facing arms 20 are formed as and function as hooks to mate inclined shoulders 12 of ribs 7 (on pipe/duct 1) with ends 26 of clip 6.

The pull-out strength of clip 6 can be monitored by the size of hooks 25 that mate against the inclined shoulders 12. Recess 14 can be added in the corresponding part of inclined shoulders 12, thus allowing larger design and contact size for elements 25 and 26.

Referring to FIG. 3, to position clip 6 over pipe/duct 1, clip 6 also includes flat inclined shoulders 27 that position against shoulders 9 (see FIG. 6) of pipe/duct 1 in order to control radial/angular orientation of clip 6 over the pipe/duct 1. Arcuate rib 23 positions clip 6 along the axial direction of pipe/duct 1 by engagement between ribs 7 in recess 8. Internal surface 28 of clip 6 mates surface 11 of pipe/duct 1 and constitutes a flattened portion of the T-shaped profile of arcuate rib 23.

Arcuate rib 23 is protected by profile 24 on the outer sides of clip 6, thereby forming arcuate recesses 32 of inverted L section, open to the outside. This combination creates the mentioned "T" profile 23/24 that is easy to bend, with improved torsion resistance. The upper part 24 of T-shaped profile 23/24 also covers ribs 7 of pipe/duct 1 when clip 6 is fitted.

An outwardly-projecting rib 31 may be added to strengthen clip 6 in its central part, which is most stressed area during part assembly. The width of opening 21 may be adjusted to accommodate different resin selections for clip 6.

Referring now to FIG. 3, cable holders or fixing domes for screws, shown as element 22, may be designed to accommodate different screws or cable sizes.

When the injection-molding process is properly gated, clip 6 is weld ("knit") line free and the tooling is relatively simple. That is, no movable cores are needed.

The clip to pipe/duct configuration described herein does not require new manufacturing processes or resins. It is possible to simplify the installation of brackets and clips at the location of use to result in cost and process savings. Neither does clip 6 require any welding or over molding operations as it is simple in structure and easy to produce. Specifically, clip 6 does not require welding or robotic equipment, additional tooling or fixtures, particular process settings or an adhesion strength. Furthermore the risks of welding or overmolding failures are eliminated, hence a higher production yield results. In addition, if clip 6 were to accidentally break, the entire duct need not be replaced, only the clip.

Because it does not require welding during manufacture, clip 6 has improved ease of fit and removal and provides an accurate fitted positioning. This is due to the T-shaped profile 23/24. Clip 6 also possesses good pull-out strength because of the correspondence between the pairs of arcuate ribs 7 on pipe/duct 1.

What is claimed is:

1. A clip of molded plastics material for fitting onto a pipe or duct, the clip comprising an open ring of generally C-shape having facing arms, the facing arms having open ends that can be sprung apart and together to resiliently fit the clip onto a pipe or duct of corresponding diameter, each facing arm having i) a profiled inner surface adapted to engage with complementary profiles carried by the pipe or duct, whereby the clip is held onto the pipe or duct, and ii) an inwardly-directed arcuate rib extending along the inner face of the facing arm and forming a substantially T-shaped profile, the profile having a projecting edge, wherein each substantially T-shaped profile forms in each facing arm a pair of arcuate recesses that are adapted to receive a pair of complementary spaced-apart arcuate ribs carried by the pipe or duct and, wherein the projecting edge of each profile faces inwards and forms part of a generally cylindrical inside surface of the clip, such that when the clip is fitted onto a pipe or duct the projecting edge fits into the complementary profiles carried by the pipe or duct and the arcuate ribs carried by the pipe or duct fit into the arcuate recesses formed in each facing arm, whereby the clip is held onto the pipe or duct.

2. The clip according to claim 1, wherein a central part of the C-shaped clip has an internal surface generally of partially-cylindrical shape that is extended on each side by the surface of the inwardly-facing edge of the substantially T-shaped profile.

3. The clip according to claim 2, wherein said central part comprises on its outside an outwardly-projecting reinforcing rib.

4. The clip according to claim 2, comprising inclined shoulders where the substantially T-shaped profile merges with said central part.

5. The clip according to claim 1, wherein the central part of the C-shaped clip carries at least one outwardly-extending member for securing cables or the like to the clip or for securing the clip to a support.

6. The clip according to claim 1, wherein the substantially T-shaped profiles extend to adjacent the ends of the opposing arms, said ends of the arms being formed as hooks by the top parts of the substantially T-shaped section merging into its inner edge.

7. The clip according to claim 1, wherein said recessed parts open into the sides of the clip's arms.

8. The clip of claim 1 fitted onto a pipe or duct, wherein the pipe or duct comprises two pairs of side-by side arcuate ribs on opposite sides of a cylindrical part of the pipe or duct, the two pairs of side-by side arcuate ribs being aligned with one another leaving uninterrupted cylindrical surface parts on opposite sides of the pipe or duct between the ends of the two pairs of side-by-side arcuate ribs, said pairs of side-by-side arcuate ribs on the pipe or duct being received in the pairs of arcuate recesses on either side of the substantially T-shaped profiles on the facing arms of the clip.

9. The clip of claim 8 fitted onto an automotive fluid duct.

10. A pipe or duct adapted to be fitted with a clip according to claim 1, wherein the pipe or duct comprises two pairs of side-by side arcuate ribs on opposite sides of a cylindrical part of the pipe or duct, the two pairs of side-by side arcuate ribs being aligned with one another leaving uninterrupted cylindrical surface parts on opposite sides of the pipe or duct between the ends of the two pairs of side-by-side arcuate ribs, said pairs of side-by-side arcuate ribs on the pipe or duct being adapted to be received in the pairs of arcuate recesses on either side of the substantially T-shaped profiles on the facing arms of the clip.

11. The pipe or duct of claim 10, wherein ends of said side-by-side ribs comprise inclined shoulders that extend from the tops of the ribs to said uninterrupted cylindrical surface part of the pipe or duct.

12. The pipe or duct as recited in claim 10, wherein said pairs of side-by-side arcuate ribs are placed on a part of the pipe or duct spaced apart axially along the pipe or duct from at least one flexible section that includes a bellows.

13. The pipe or duct of claim 10 which is a blow molded pipe or duct of formed of plastics material, an extruded pipe or duct formed of plastics material or an injection molded pipe or duct formed of plastics material.

14. The pipe or duct of claim 13, which is a blow-molded pipe or duct of plastics material.

15. A duct of claim 10 which is an automotive fluid duct.

* * * * *